Figure 1:
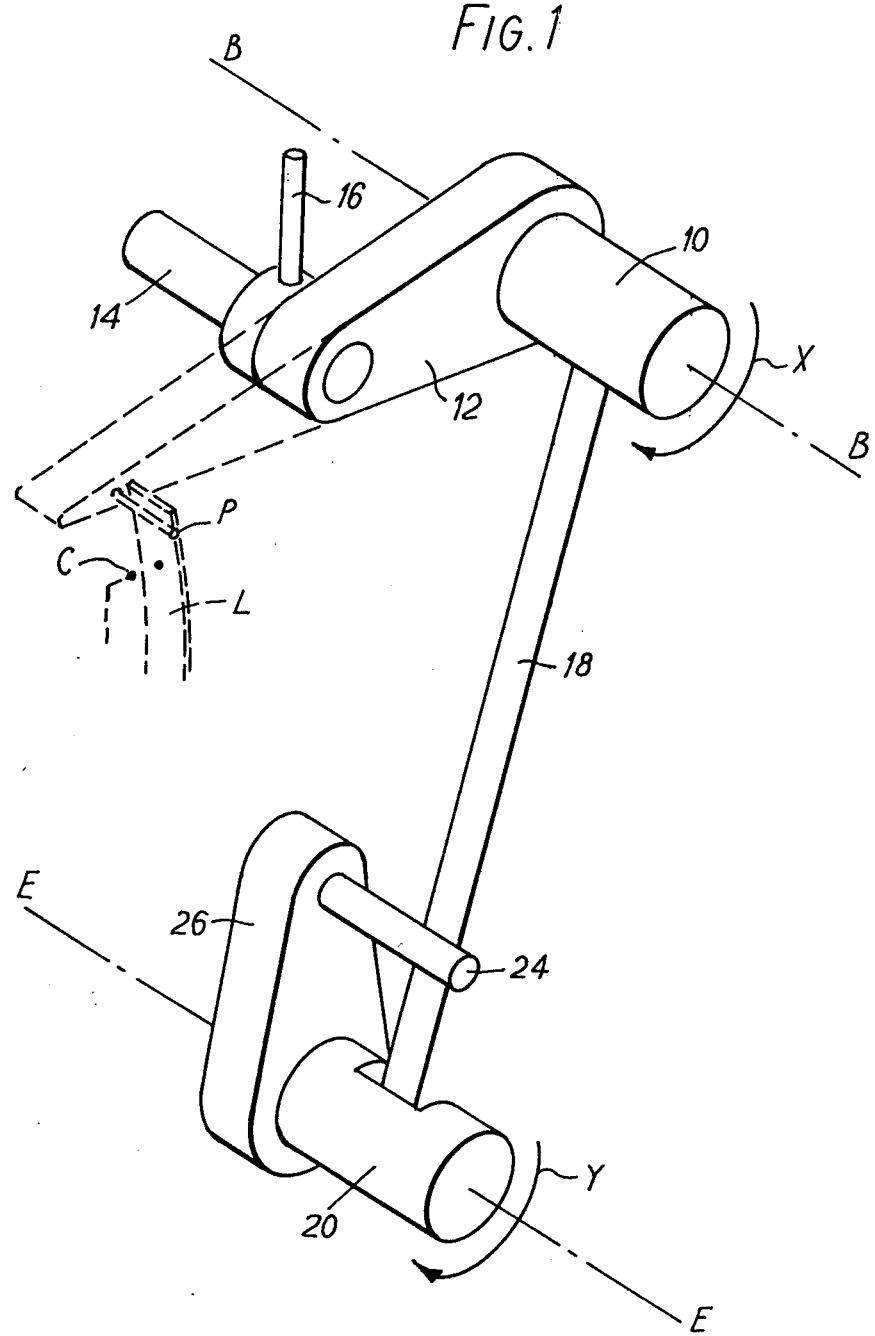

United States Patent [19]
Selfe

[11] 4,267,639
[45] May 19, 1981

[54] INDICATING INSTRUMENTS
[76] Inventor: Barry D. Selfe, "Fourays", Capel, England
[21] Appl. No.: 49,970
[22] Filed: Jun. 19, 1979
[30] Foreign Application Priority Data
Jun. 19, 1978 [GB] United Kingdom ............... 27223/78
[51] Int. Cl.³ ............................................... G01B 3/22
[52] U.S. Cl. ................ 33/172 R; 33/125 R
[58] Field of Search ............ 33/172 R, 125 R, 169 R, 33/174 R
[56] References Cited
U.S. PATENT DOCUMENTS
2,840,917 7/1958 Koch .................................. 33/172 B

*Primary Examiner*—Harry N. Haroian
*Attorney, Agent, or Firm*—Wenderoth, Lind & Ponack

[57] ABSTRACT

An indicating instrument, particularly for indicating small displacements of a feeler for use in locating the precise position of notches in a program strip to set up a machine tool. The instrument has a lever arm fixed with respect to the feeler and an abutment member moved by the lever arm to give mechanical movement magnification, the degree of magnification being different for different ranges of movement so that the instrument is most sensitive at a predetermined zone of feeler movement, thereby allowing a condensed indicator scale.

8 Claims, 6 Drawing Figures

INDICATING INSTRUMENTS

This invention relates to an indicating instrument in which the movement of a feeler after magnification by a mechanical linkage, is applied to produce a corresponding movement of an indicator. Such indicating instruments find application for many purposes such for example as a position indicator or as a means for accurately setting up a mechanical tool to perform a machining operation.

According to the present invention there is provided an indicating instrument comprising a first member which is mounted for pivotal movement about a first axis; a feeler secured to the first member; a lever arm mounted by one end to the first member and extending away from the first axis; a second member mounted for pivotal movement about a second axis which is parallel to and spaced from the first axis; a first abutment on the second member; a second abutment on the second member further from the said axis than the first abutment, and an indicator device coupled to give an indication corresponding to the angular movement of the second member, the arrangement being such that movement of the feeler rotates the first member, thereby swinging the lever arm which turns the second member by co-operation with firstly the second abutment to give a certain sensitivity and then with the first abutment to give a greater sensitivity.

Such an arrangement enables the degree of magnification to be altered stepwise as the feeler is moved from its initial position.

Thus, the instrument can be highly sensitive at a predetermined zone of operation of the feeler and less sensitive when the feeler is displaced to a position not as far as the predetermined zone. This means that the instrument can be sensitive where required without needing an unduly large indicator movement.

In a preferred arrangement the first abutment is constituted by the intersection, with a substantially radially extending surface, of a cylindrical bore formed in the second member concentric with the second pivot axis.

In such arrangement a second abutment may be constituted by the intersection of the surface with the outer periphery of the member or its part. Abutments formed in this manner enable the magnification to be determined very accurately since it is a simple matter to machine the bore and the outer diameter of the member or its part so as to provide abutments at precise distances from the pivotal axis. Also, one or more intermediate abutments may be provided by suitably angled faces.

The invention also includes a system for use in setting up a machine tool comprising an instrument as above described adapted to be mounted on one part of the machine and a programme strip adapted to be mounted on another part of the machine for movement relative to the instrument, the programme strip having the predetermined positions along its length means for actuating the feeler of the instrument.

Figure 2:
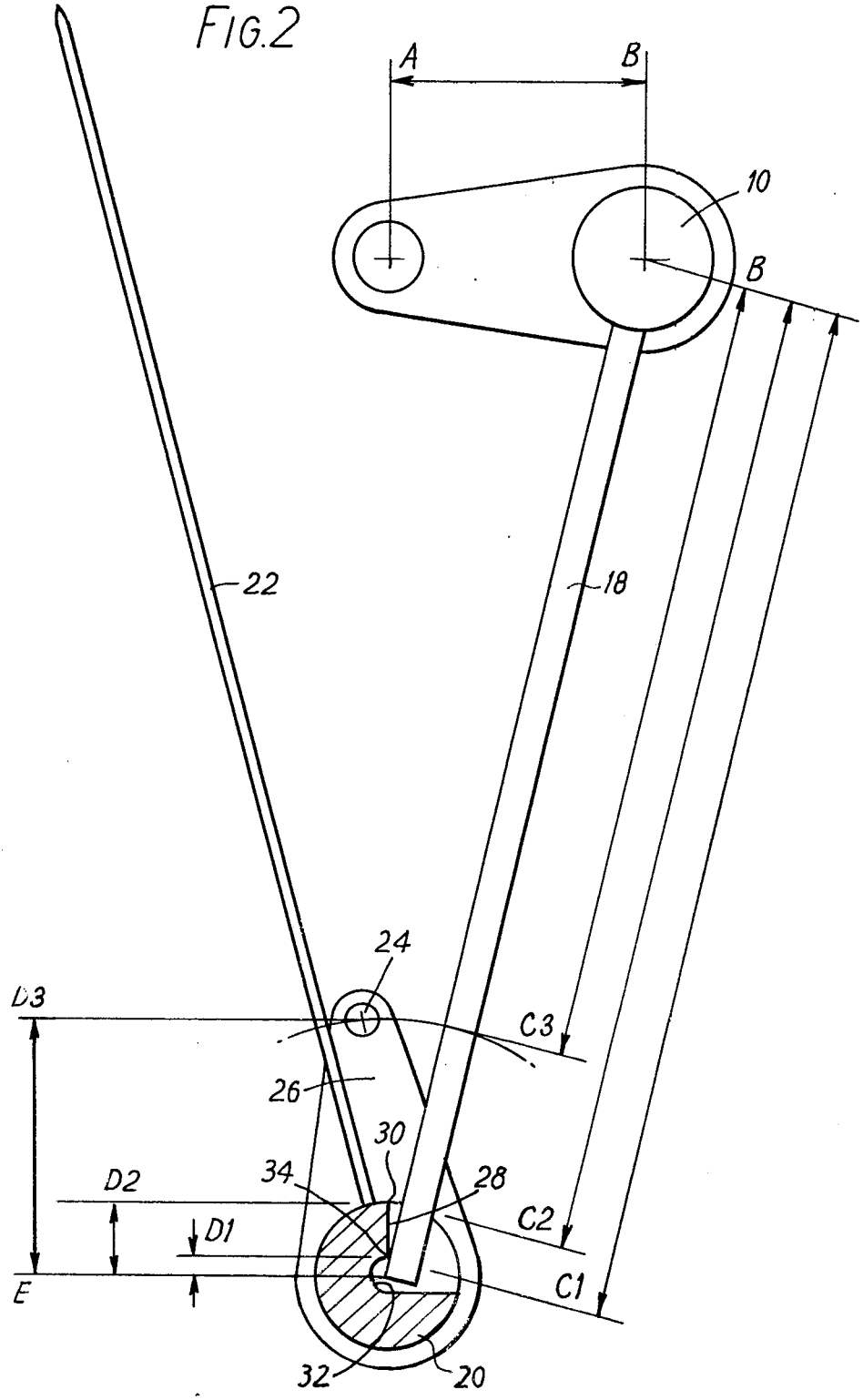
Figure 3:
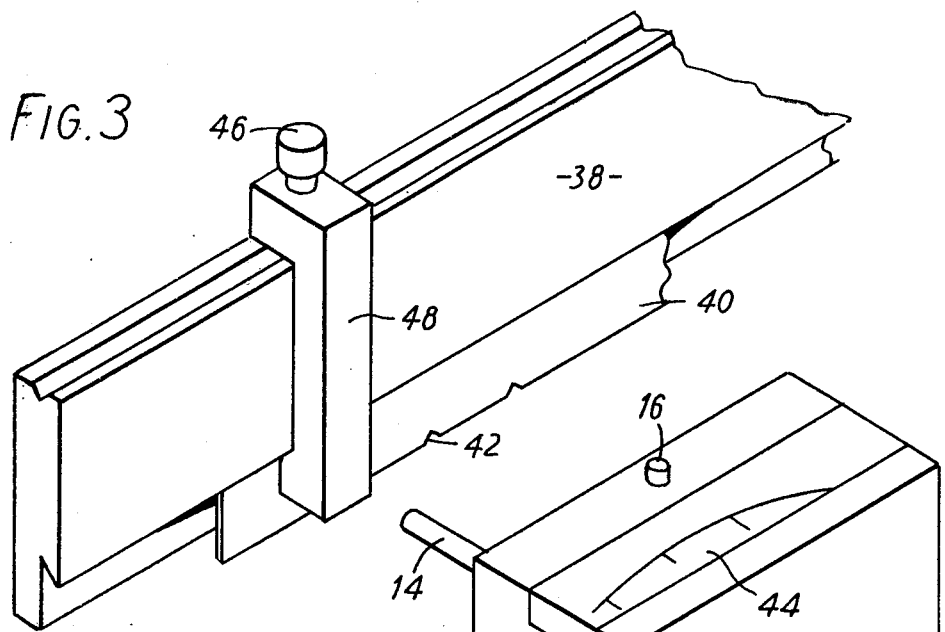
Figure 4:
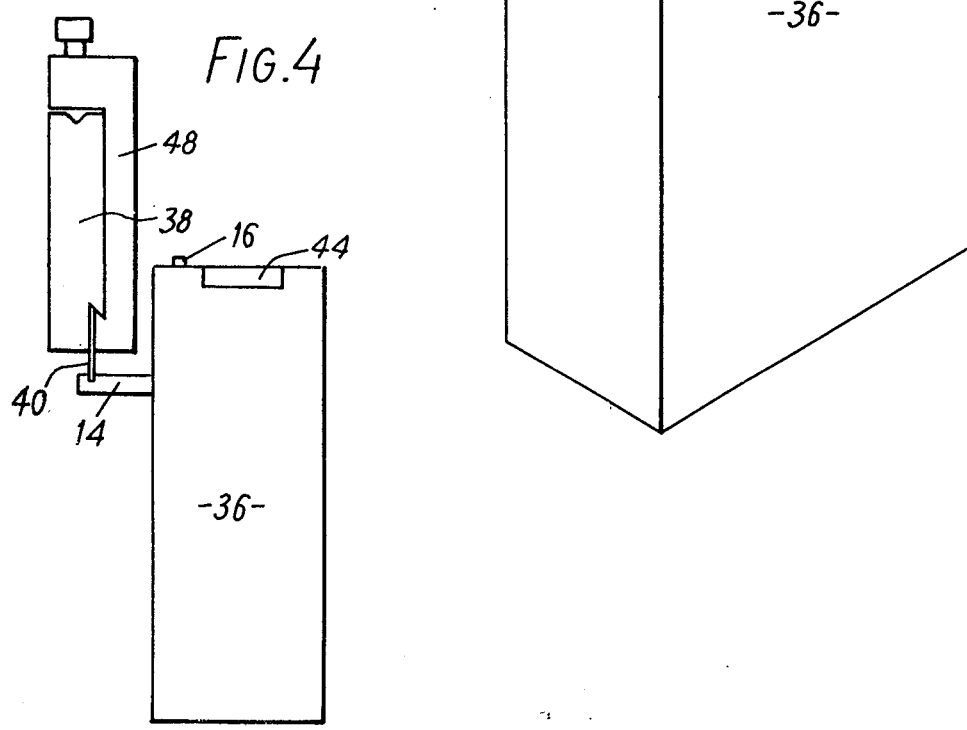
Figure 5:
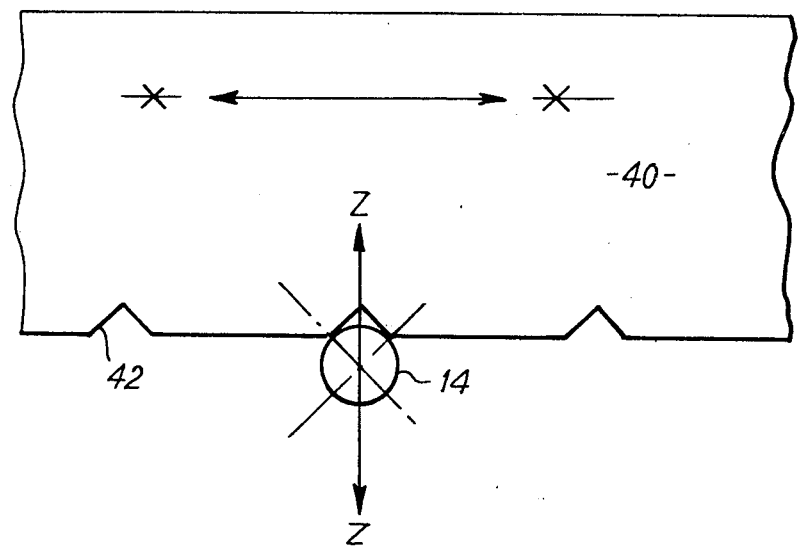
Figure 6:
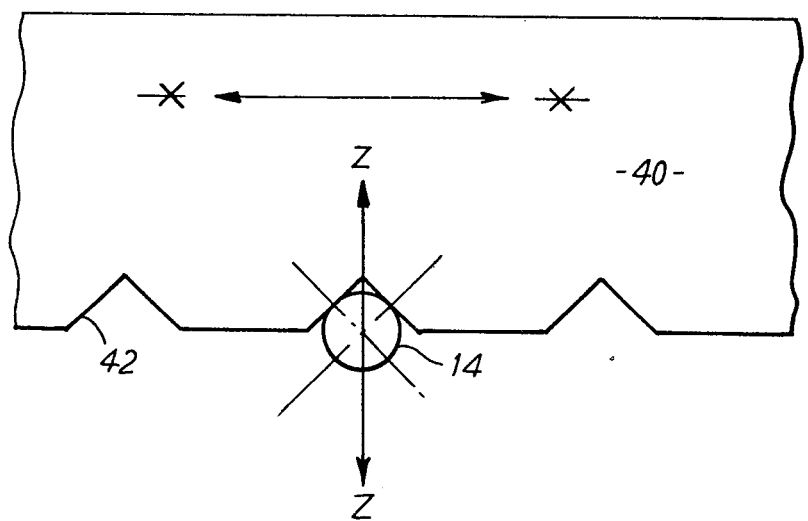

Some arrangements in accordance with this invention will now be described with reference to the accompanying drawings in which:

FIG. 1 is a perspective view showing the essential elements of one form of instrument in accordance with the invention, FIG. 2 is a diagrammatic part-sectional front elevation of the instrument viewed from the right in FIG. 1, FIGS. 3 and 4 are respectively a perspective view and an end elevation illustrating the use of the instrument in conjunction with a programme strip in a machine tool, and FIGS. 5 and 6 show alternative forms of programme strip.

Referring firstly to FIGS. 1 and 2 the instrument comprises a first member 10 which is mounted in bearings for pivotal movement about an axis B and is biased for movement in the direction shown by the arrow X by a spring arrangement. The member 10 carries a crank 12 from which a feeler 14 projects parallel to the axis B and a short arm 16 projects at right angles to this axis; the purpose of this arm being explained below. One end of a layer arm 18 is secured to the member 10.

The spring arrangement may be constituted by the arrangement shown in broken lines, where a leaf spring L co-operates with a pin P on an extension of a crank 12. When provided, the leaf spring may form part of a switch indicated schematically by a contact C which makes or breaks to allow an indication to be given electrically of when the feeler 14 is within a normal operating range of displacement.

A second member 20 is mounted in bearings, not shown, for pivotal movement about an axis E which is parallel to and spaced from the axis B, and the member is biased in the direction shown by the arrow Y by spring means, not shown. The member carries a pointer 22 the free end of which co-operates with an arcuate scale (not shown).

The illustrated instrument provides three degrees of magnification which come into operation in succession as the feeler 14 is moved. To this end the member 20 is provided with three abutments arranged at different distances from the axis E which are acted on in succession by the lever arm 18. The third abutment from the axis in constituted by a pin 24 which is carried on a crank 26 fast with the member 20. The second and first abutments are constituted by the intersection of a radially extending surface 28 with the outer surface of the member 20 at 30 and with a central bore 32 at 34. Since the member 20 can be machined accurately to provide a bore and outside diameter concentric with the axis E the radial distances from this axis of the abutments 30 and 34 can be precisely determined.

It will be appreciated that in the illustrated arrangement and on account of the spring bias applied to the members 10 and 20 when the feeler 14 is in its initial position the abutment 24 will be engaged by the lever arm 18 and that as the feeler moves this arm will act on abutment 24 to rotate the member 20 and thus move the pointer. After the member 20 has moved through a certain angle the lever arm will engage the abutment 30 to increase the magnification and finally will engage the abutment 34 to provide the highest magnification.

It will be seen that the magnification ratio will be proportional to the distance between the axis B and the point on lever arm 18 which engages an abutment and inversely proportional to the distance of the abutment from the axis E so that in the illustrated arrangement the magnification ratios are BC3/ED3, BC2/ED2 and BC1/ED1 respectively.

With this arrangement and in a compact instrument not more than about 10 cms high it is found possible to obtain a degree of magnification in excess of 500/1 which enables measurements down to 1 micron to be made.

FIGS. 3 and 4 illustrate diagrammatically how the instrument may be used for setting up a machine tool for a machining operation. The instrument 36 is mounted on one part of a machine while an elongate bar 38 supporting a programme strip 40 in contact with the instrument feeler 14 is mounted on another part of the machine which moves relative to the first part, the direction of relative movement being normal to the plane of the paper as regards FIG. 4.

The programme strip 40 is provided with notches 42 at predetermined positions along its length. When a notch comes above the feeler 14 this feeler will move upwards to cause the pointer 22, FIG. 2, to move over the scale 44 and by adjusting the machine for maximum deflection of the pointer the machine can be set very accurately to a position determined by the position of the notch on the programme strip 40.

Since it is desirable to be able to change one programme strip for another, or to arrange more than one programme strip along the bar 38 this bar is conveniently arranged as illustrated so that the strip 40 can be clamped onto the bar by tightening the screw 46 on a clamp 48, as many clamps being provided as required.

The notches 42 in the strip 40 may be ground or they may be made by means of a press and, if necessary, they can then be lapped accurately to shape. In some cases the machine may be provided with a suitable press so that the notches may be formed in situ, and exactly in the right place.

For example, it is envisaged that the programme strip may be notched directly on the machine by mounting the press and the strip on the machine so that they move relative to each other in direct relation to the movements imparted by the lead-screw of the machine. Then, at appropriate positions determined, perhaps, by a prototype on the machine, the punch is operated to produce a notch. Thereafter, the use of the programme strip in the manner described will reproduce those positions to allow the predetermined operations to be carried out. This arrangement can also be used to copy programme strips, the master strip being used to determine the machine positions and the punch being used to those positions to produce a copy strip.

Instead of using an on-machine press, a press remote from the machine and having its own lead screw may be used.

FIGS. 5 and 6 illustrate alternative forms the notches may take. In the arrangement of FIG. 5 the notches are narrow and relatively shallow. In FIG. 6 however the notches are wider and deeper so that the feeler 14 will move linearly upwards along one side of the notch until it reaches a central position. It will be seen that with the instrument described, the sensitivity is greatest when the feeler is at the apex of the notch, so that precise location of the position of the apex is possible. However, since the sensitivity is less elsewhere, the instrument does not have an unduly large scale.

It will be appreciated that it is possible to reverse the described arrangement by arranging the notches on the upper edge of the programme bar instead of on the lower edge as shown. In either case it is also possible that the feeler 14 could be arranged to carry a form of notched plate which would co-operate with pins arranged on the programme bar.

In the use of this arrangement is may be difficult to observe movement of the instrument pointer as the machine is being adjusted and it would be possible for a notch to be passed unseen. The instrument is therefore provided with the arm 16, FIG. 1, which extends through the instrument casing as shown in FIGS. 3 and 4. By placing a finger on the end of this arm it is very easy to feel when the feeler 14 engages a notch and movement of the machine can then be stopped.

The switch referred to above can be arranged to operate an audible or visible warning or in special cases this switch could be included in the control circuit of a motor arranged to provide the machine movement.

The improved instrument of this invention has many possible applications. As an example it may be used for the accurate measurement or checking of angles. In such case the feeler would co-operate with a notch in the edge of a disc which is mounted on a blade. The blade may be urged against the face of a workpiece arranged on a base plate and the instrument will indicate the extent to which the angle of the workpiece departs from the prescribed angle, for example a right-angle.

The notched programme strip may be bent around a circular drum so that accurate angles of rotation of the drum may be determined by the instrument.

The instrument may have only two abutments instead of the three described. Alternatively it may have four or more abutments.

In the embodiment described, the indicator device is a pointer. However, the indication may be given electronically and to this end there may be provided a digital read-out unit, one example of which is photo-electric. Thus, there may be provided a transparent scale coupled to be moved by the second member and carrying a track of alternate transparent and opaque marks. The track is interposed between a light source and a photo-cell so that movement of the scale gives a digital output which is counted and displayed by a digital display on the instrument. An improvement of this basic system is to arrange a set of parallel tracks on the scale associated with respective photo-cells, the tracks being arranged in asending order of digital significance, as in a Gray code scale, for example. In this way a digital output of position is derived without counting, and the possible errors associated therewith.

What I claim is:

1. An indicating instrument comprising a first member which is mounted for pivotal movement about a first axis; a feeler secured to the first member; a lever arm having one end mounted on the first member and extended away from the first axis; a second member mounted for pivotal movement about a second axis which is parallel to and spaced from the first axis; a first abutment on the second member; a second abutment on the second member further from the second axis than the first abutment; and an indicator device operatively associated with said second member to give an indication corresponding to the angular movement of the second member, said lever arm engaging said second member for, when movement of the feeler rotates the first member, swinging the lever arm, turning the second member first by co-operation with the second abutment to give a certain sensitivity and then by cooperation with the first abutment to give a greater sensitivity.

2. An indicating instrument as claimed in claim 1 further comprising a third abutment on the second member further from the second axis than the second abutment, the lever arm co-operating with the third abutment before the second.

3. An indicating instrument as claimed in claim 2 wherein the first abutment is constituted by the intersection, with a radially extending surface, of a cylindrical bore formed in the second member concentric with the second pivot axis.

4. An indicating instrument as claimed in claim 3 wherein the second abutment is constituted by the intersection of the radial surface with the outer periphery of the second member.

5. An indicating instrument as claimed in claim 4 wherein the third abutment is a pin fixed with respect to the second member.

6. An indicating instrument as claimed in claim 1 wherein the indicator device is a pointer mounted on the second member.

7. An indicating instrument as claimed in claim 1 further comprising a switch coupled to the first member so as to be operated when the indicator device is beyond a normal operating range.

8. A system for setting up a machine tool, the system comprising a programme strip having an edge with notches at predetermined positions along its length, the strip being adapted to be mounted on one part of the machine tool, an indicating instrument being adapted to be mounted on a second part of the machine tool, said first and second parts being movable with respect to each other, said indicating instrument having a first member which is mounted for pivotal movement about a first axis, a feeler secured to the first member; a lever arm having one end mounted on the first member and extended away from the first axis; a second member mounted for pivotal movement about a second axis which is parallel to and spaced from the first axis; a first abutment on the second member; a second abutment on the second member further from the second axis than the first abutment; and an indicator device operatively associated with said second member to give an indication corresponding to the angular movement of the second member, said lever arm engaging said second member for, when movement of the feeler rotates the first member, swinging the lever arm, turning the second member first by co-operation with the second abutment to give a certain sensitivity and then by cooperation with the first abutment to give a greater sensitivity, the feeler of the instrument being movable along the said edge of the strip during relative movement of said parts for co-operating with the notches so as to allow the notches to be located accurately.

* * * * *